No. 12,147. REISSUED AUG. 18, 1903.

E. F. PRIDDAT.

TIE FASTENER.

APPLICATION FILED DEC. 19, 1902.

Witnesses:

Carl Gaylord,

John Enders Jr.

Inventor:

Ernst F. Priddat,

By Dyrenforth, Dyrenforth & Lee,

Att'ys.

No. 12,147. Reissued August 18, 1903.

UNITED STATES PATENT OFFICE.

ERNST F. PRIDDAT, OF CHICAGO, ILLINOIS.

TIE-FASTENER.

SPECIFICATION forming part of Reissued Letters Patent No. 12,147, dated August 18, 1903.

Original No. 686,477, dated November 12, 1901. Application for reissue filed December 19, 1902. Serial No. 135,909.

*To all whom it may concern:*

Be it known that I, ERNST F. PRIDDAT, a citizen of the United States, residing at Chicago, in the county of Cook and State of Illinois, have invented a new and useful Tie-Fastener, of which the following is a specification.

My object is to provide a device of simple and inexpensive construction for use in fastening the ends of twine when wrapped around packages to obviate the necessity of tying the twine.

Figure 1:
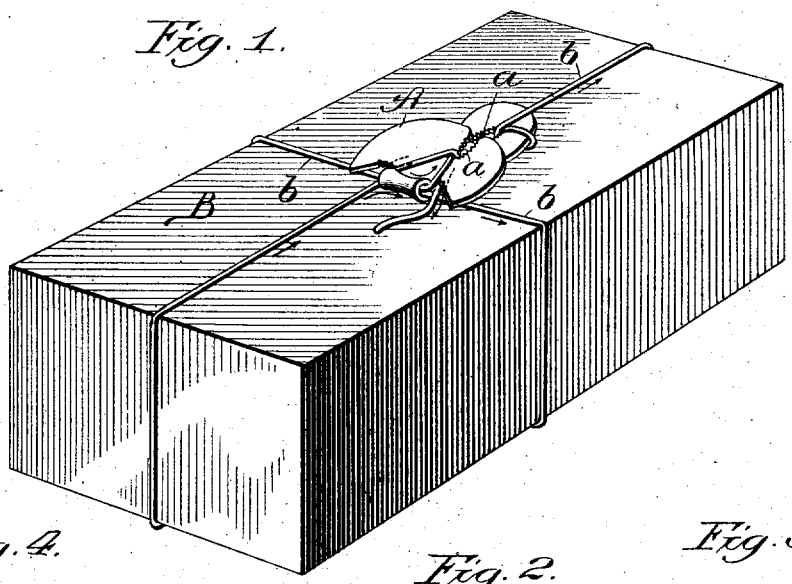
Figure 4:
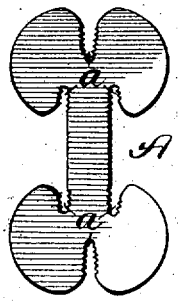
Figure 2:
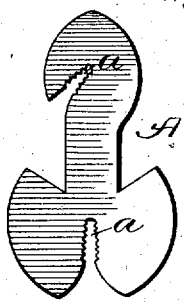
Figure 5:
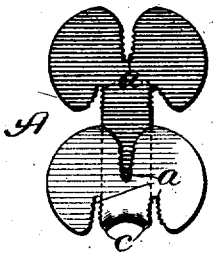
Figure 6:
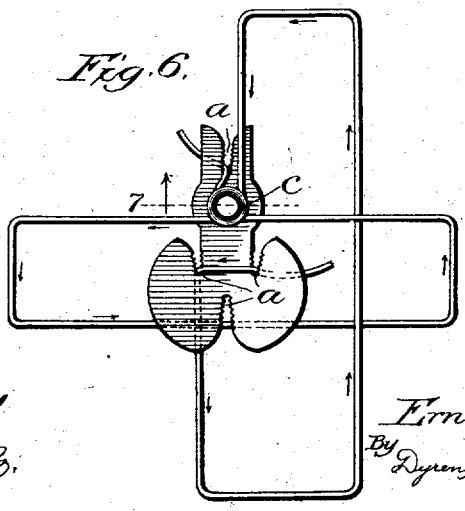

In the drawings, Figure 1 is a perspective view of a package wrapped with twine the ends of which are secured without tying by means of a fastener of my improved construction; Fig. 2, a sheet-metal blank or fastener of one form which when bent upon itself, as shown, produces the device shown in Fig. 3; Fig. 4, a blank which may be bent to produce the device shown in Fig. 5; Fig. 6, a tie-fastener according to my invention in still another form, with one manner of securing a cord illustrated; and Fig. 7, a section on line 7 of Fig. 6.

In providing my improved tie-fastener I employ a plate or blank of preferably flexible sheet metal A, formed in its edge with comparatively deep and tapering twine-gripping slots or recesses *a*, which are preferably serrated, as shown. The device may be flat upon its under side to rest flatwise upon the surface of the package, and when of sufficiently thin and flexible metal it may under the stress of the wrapping-twine *b* conform to the surface of a rounded package. The twine-gripping slots may be disposed in various ways along or about the blank, and preferably two or more such slots are provided upon the blank.

Figure 7:
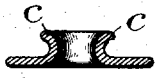

The device may be provided in the flat form shown, for example, in Figs. 2 and 4; but I prefer to provide it with an outwardly-projecting part presenting a smooth and preferably rounded shoulder *c*, across which the twine may be drawn in changing its direction in the operation of winding it around the package. In the construction shown in Figs. 3 and 5 the rounded shoulders *c* are produced by bending the blanks upon themselves, as shown, while in Fig. 6 the shoulder *c* is produced by a button on the blank. This button may be formed by puncturing and expanding the metal of the blank itself, as illustrated in Fig. 7.

Figure 3:
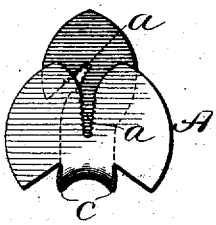

The construction shown in Fig. 1 is like the construction of Fig. 3, except that the notches at the bases of the uppermost lobes are serrated instead of plain.

To wrap the twine *b* about a package—such, for example, as the package B in Fig. 1—one end portion of the twine is inserted into one of the gripping-slots *a* of the fastener A to be held thereby, and the twine is then passed around the package in one direction and then in the other direction (turning over the shoulder *c*) and inserted toward its free end in another gripping-slot *a* of the device. For greater security the twine after being gripped at its initial end may be passed one or more times about the adjacent part of the device, and after being gripped at its opposite end portion it may be again passed about adjacent parts of the device and gripped again. The operation may be performed as shown in Fig. 1, where the arrows represent the course of the cord, or in any other desired manner. By providing the shoulder *c* on the device the change in direction of the twine may be easily brought about, and the twine may be drawn taut across the shoulder when changing its direction and before causing it to be gripped. When the wrapping is performed, the twine will be as taut as desired and held at its ends with great security against accidental disengagement without being tied. Either end of the twine may be quickly and easily disengaged from the device when desired without the necessity of untying any knots.

My improved device is particularly desirable for use in securely tying packages which in passing through the mails are required to be opened for inspection. The device will also be found useful in the tying of bundles or packages of any kind on account of the security and facility with which it enables the operation to be performed.

The device may be of any desired configuration which will not interfere with its function, and as it is formed, by preference, of thin metal it may be manufactured at comparatively small cost and sold at a low price.

With the device in the modified form shown in Fig. 6 a simple and effective tie may be formed in the manner indicated, the cord following the course indicated by the arrows. In this form the device may be characterized as a simple or unfolded flat member having twine-gripping slots at or near its extremities and an intermediate bearing over which the cord may be drawn freely in changing direction and in the tightening operation. Considering the slots, in which the cord is shown gripped, it will be observed that they open in the same general direction and that they and the bearing are in substantial alinement. The bearing is always rounded or smooth, so that the twine may be drawn under considerable tension across it. Preferably it projects above the upper surface of the member which bears it and is concaved or hooked to permit the cord to change direction while resting upon said upper surface. This modification possesses the advantage that it may be stamped and a suitable bearing formed at one operation, it being understood that the bearing may be variously changed in form, and also it possesses some advantage in the simplicity of the tie which it permits and the ease with which its use is learned. Obviously it can be formed with less metal than the other form, exposed spaces for advertising purposes being equal.

What I claim as new, and desire to secure by Letters Patent, is—

1. As a new article of manufacture, a tie-fastener for packages comprising a plate of thin metal provided in its edge with a plurality of twine-gripping slots, and bent upon itself to form a shoulder across which the twine may be drawn, substantially as and for the purpose set forth.

2. As a new article of manufacture, a tie-fastener for packages, comprising a plate of thin sheet material provided in its edge with a plurality of twine-gripping slots cut therein and an integrally-formed smooth shoulder projecting above the upper surface of the main portion of the device, for the purpose set forth.

ERNST F. PRIDDAT.

In presence of—
L. HEISLAR,
ALBERT D. BACCI.